United States Patent [19]

Kupcikevicius et al.

[11] 4,034,441
[45] July 12, 1977

[54] PRESIZING DISC WITH SELF-LOCKING MEANS

[75] Inventors: Vytautas Kupcikevicius, Chicago; Anton Leroy Mika, Downers Grove, both of Ill.

[73] Assignee: Union Carbide Corporation, New York, N.Y.

[21] Appl. No.: 635,275

[22] Filed: Nov. 26, 1975

[51] Int. Cl.² .......................................... A22C 13/00
[52] U.S. Cl. .................................................. 17/41
[58] Field of Search ........... 17/41, 35, 49; 426/390, 426/513, 516

[56] References Cited

U.S. PATENT DOCUMENTS

| | | | |
|---|---|---|---|
| 990,547 | 4/1911 | Gunuskey | 17/41 |
| 1,539,901 | 6/1925 | Hennes | 17/41 |
| 3,621,513 | 11/1971 | Kupcikevicius | 17/41 |
| 3,949,446 | 4/1976 | Smith | 17/41 |

Primary Examiner—Hugh R. Chamblee
Attorney, Agent, or Firm—Clement J. Vicari

[57] ABSTRACT

A sizing disc for a shirred tubular casing length utilized in a stuffing apparatus said sizing disc including a rim portion, a wall support extending inwardly therefrom and terminating in a terminal end portion defining an annulus, and frangible self-locking elements disposed on said terminal end portion.

21 Claims, 12 Drawing Figures

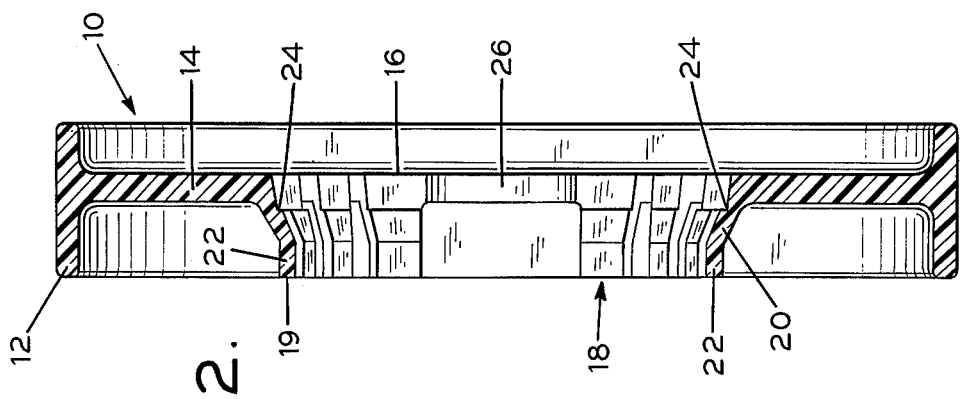
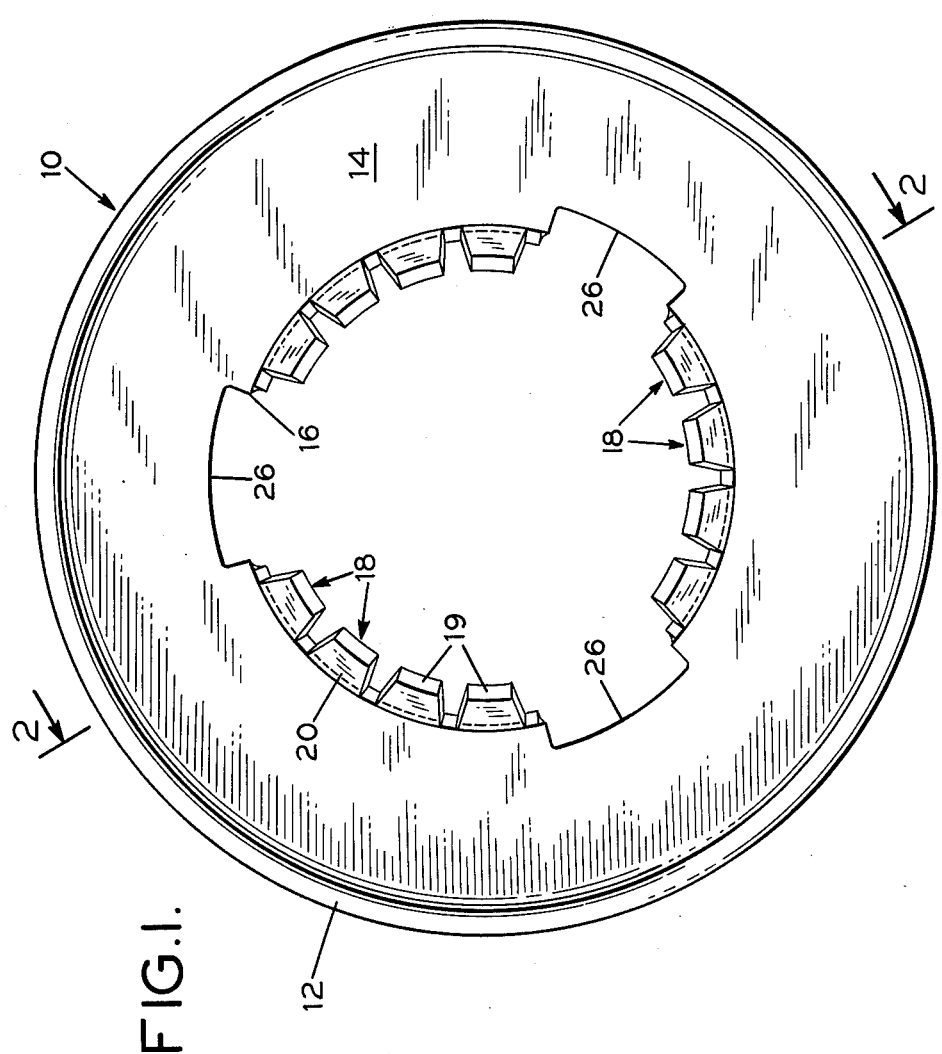

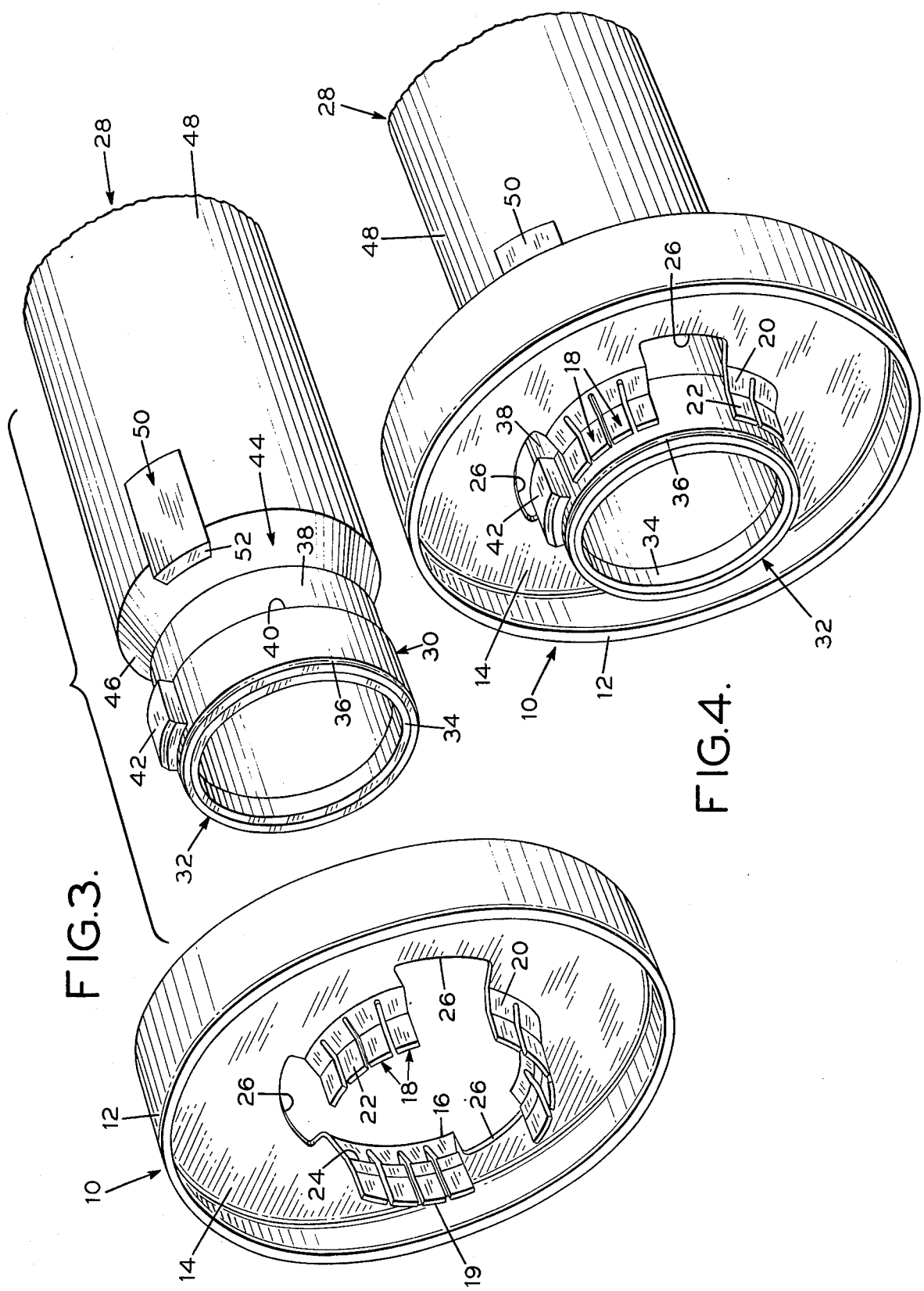

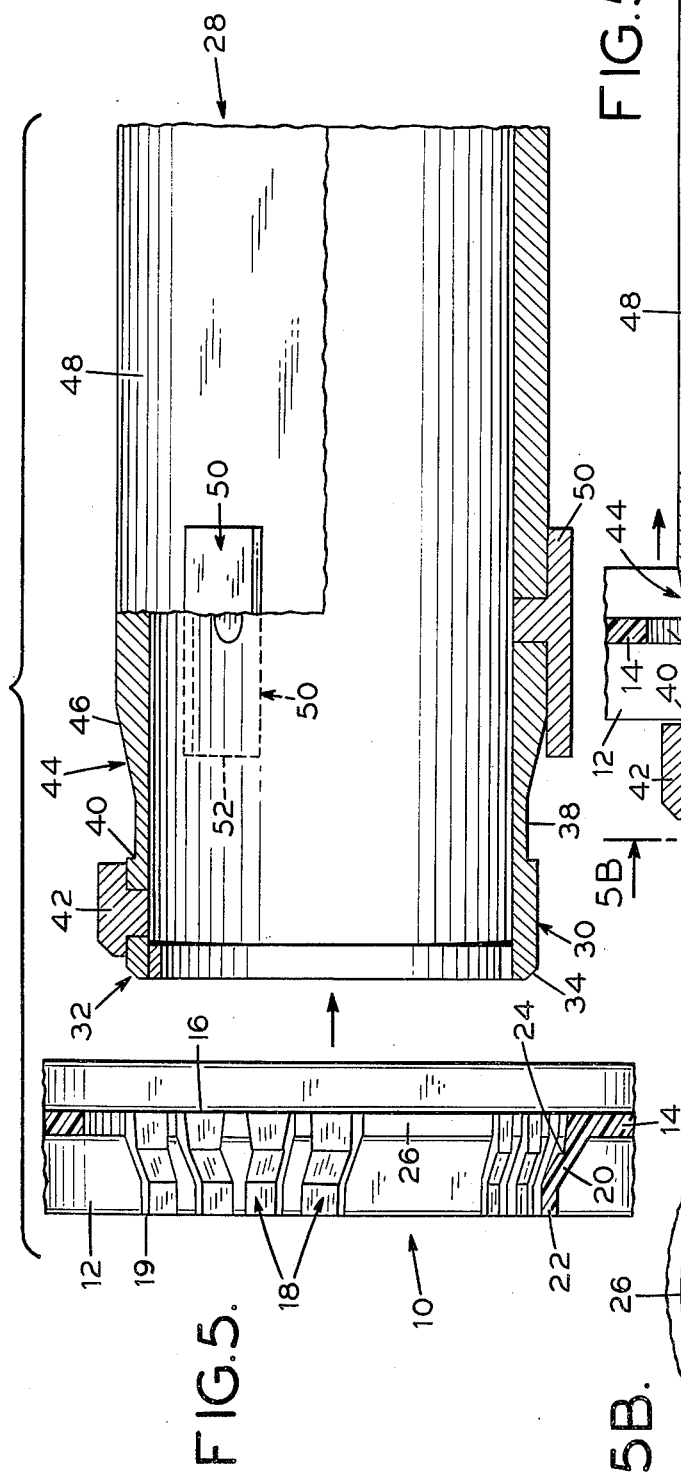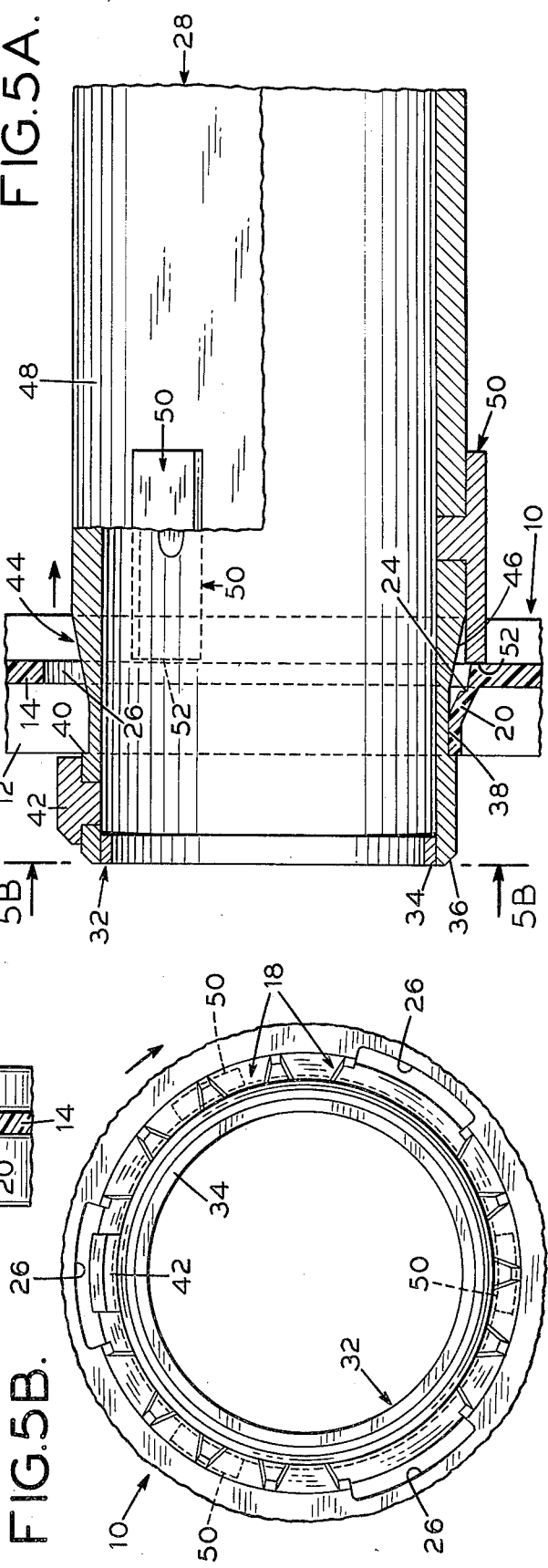

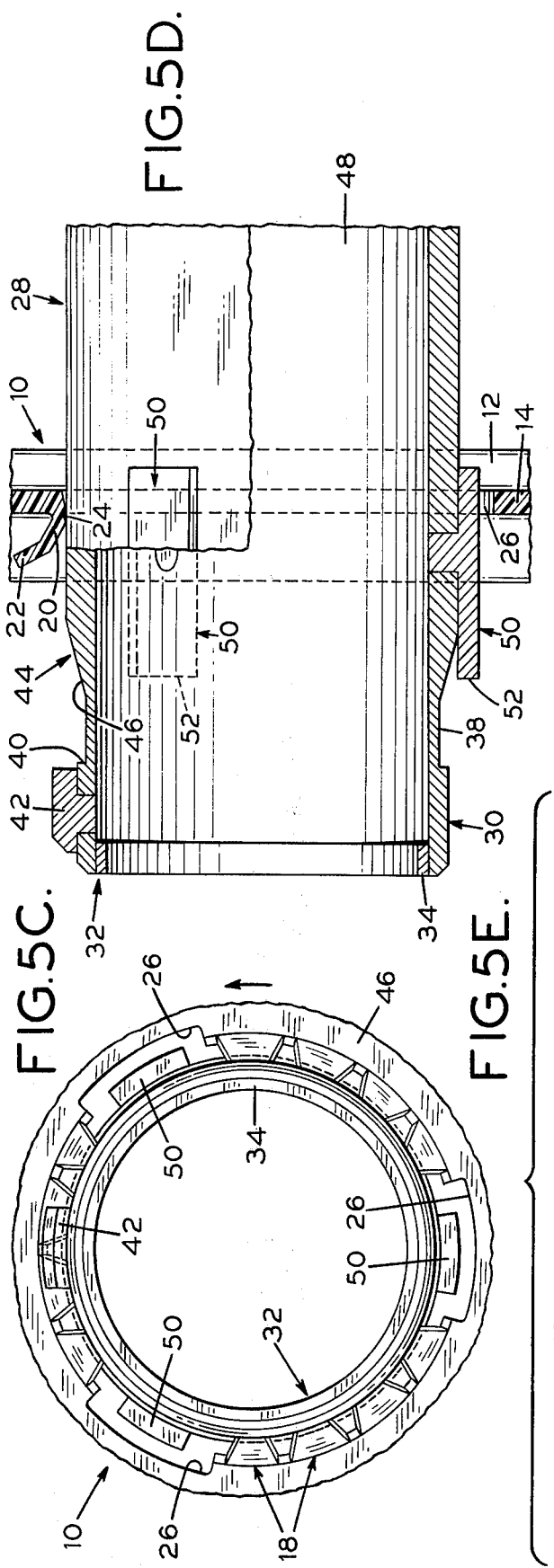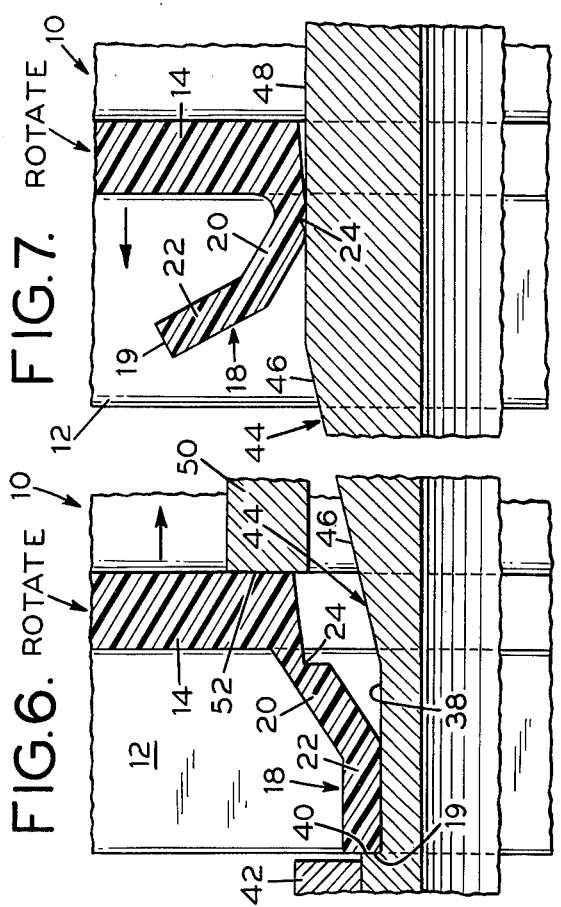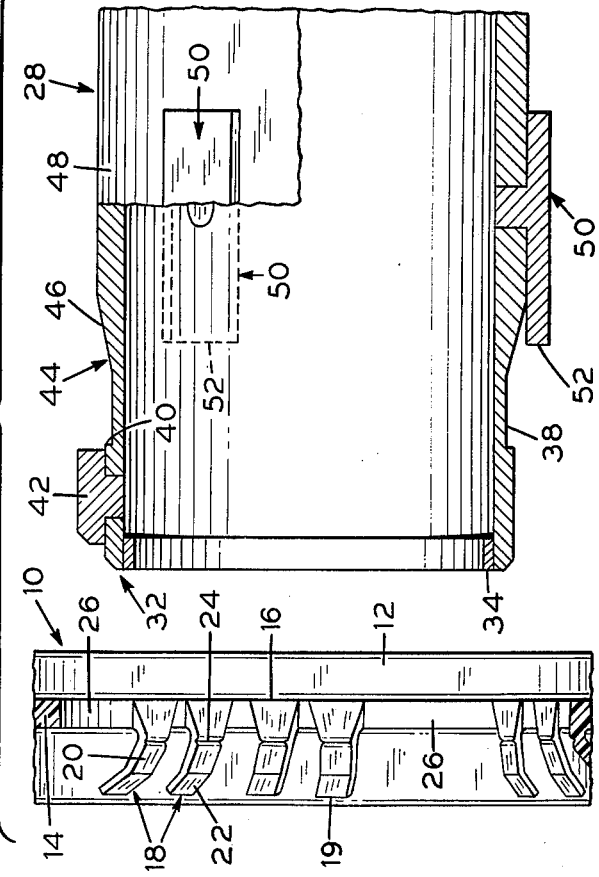

PRESIZING DISC WITH SELF-LOCKING MEANS

This invention relates to a sizing disc for a shirred tubular casing length utilized for producing a stuffed product and more particularly to a sizing disc which is provided with self-locking means for securing the sizing disc onto a stuffing apparatus.

In the meat packing industry, techniques are known for the automatic and semiautomatic filling of various types of casings with viscous meat emulsion. In general, these techniques include positioning a shirred continuous film casing length over a stuffing horn and thereafter continuously deshirring the casing and stuffing the deshirred casing with viscous meat emulsion fed under pressure through the stuffing horn and into the casing interior. As used herein, the term casing or tubular casing is intended to mean tubing of natural or manufactured materials, and the term "casing length" is intended to mean continuous tubular casing lengths. Shirred tubular casings are also known to persons familiar with the art as "sticks", such "sticks" being long lengths of casing having a substantially large bore, which have been shirred and compressed into short compact self-sustaining lengths, or which may be a package of shirred and compressed casing sheathed inside a retaining sleeve. Apparatus and processes are well known in the food casing art for producing shirred tubular cellulosic food casings such as, for example, the apparatus and processes disclosed in U.S. Pat. Nos. 2,983,949 and 2,984,574 to Matecki. These apparatus may be employed in the preparation of pleated and compressed tubular casings wherein the compression ratios (unshirred to shirred stick length) are in the order of at least about 40:1 and up to about 100:1 or even greater. Using suitable food stuffing machinery, casing lengths can be stuffed and formed into unit size links of particulate or comminuted viscous materials, such as meat emulsions, or the like.

In the art of producing sausages and similar food products, the finely divided meat compositions commonly referred to as emulsions, are conventionally stuffed into the tubular casing materials of long length which, as stated above, may be of natural or manufactured materials. Large sausage products used in slicing for multislice package putup are usually made in casings which range in size from the trade designation No. 6 (101 mm. diameter) to No. 9 (129 mm. diameter). In the production of large sausage products, a clip closed end casing of precut length is first manually sheathed over the end of a stuffing horn and then stuffed with a food emulsion. The stuffed casing is then tied, twisted or clipped into predetermined unit length cylindrical packages.

The thusly stuffed and encased food emulsion is subsequently cooked and cured according to conventional processes. A large percentage of these large sausage products are thereafter sliced and packaged into units of predetermined weight and slice count for retail sale. The high speed slicing devices employed in such packaging operations are pre-set to yield a specific weight-by-slice count for use in obtaining unit packages of equal weight. Therefore an important aspect of a commercially acceptable large sausage product is that the tubular finished processed sausage product have a substantially uniform diameter from end to end and in successive pieces of the same designated size. Moreover, the diameter of the slices must be uniformly precise in order to assure that the slices will fit into the preformed rigid packaging frequently used.

Since a large sausage casing stuffed with a food emulsion has two generally hemispherical, rounded ends, these rounded ends are generally not used in producing equal weight packages and are either discarded or reworked. Thus another aspect of importance commercially, is to have a large sausage casing stuffed with uniform tight ends, to thereby minimize the amount of food product cut-off from the cylindrical portion.

Years of commercial utilization of manufactured sausage casings such as prepared from unsupported or fibrous reinforced cellulose have provided the experience for determining optimum stuffing and processing conditions for various classes of sausage product. Sausage generally needs to be encased or stuffed to "green" or unprocessed diameters that have been selected and recommended for such optimum performance. The recommended stuffing diameter for each size and type of casing has been established and tabulated in recommended operating procedures determined by the casing manufacturer for guidance of the sausage maker.

When a casing is understuffed from the recommended "green" diameter, the result generally is a processed product that is not uniform in diameter from end to end and from piece to piece; the product is undesirably wrinkled in appearance; and the processed sausage may have an emulsion breakdown yielding undesirable pockets of fat or liquid.

When a casing is overstuffed from the recommended "green" diameter, the casing may split or break apart at the stuffing station or subsequently, in transport to or in the cooking/smoking processing operations. This results in a costly waste of meat and in the labor expense for cleanup.

For many years, the apparatus and methods employed to prepare the encased food products, and particularly food products encased in large diameter casing, have relied upon manual manipulation in controlling the stuffing of food emulsion into predetermined length sausage links or packages. Recently, advances in the art have resulted in the introduction of apparatus for machine control of the stuffing operation which have provided means for preparing uniformly sized encased products such as disclosed, for example, in U.S. Pat Nos. 2,871,508, 2,999,270, 3,264,679, 3,317,950, 3,454,980, 3,457,588, 3,553,769, 3,621,513, 3,659,317 and 3,751,764.

Although many of the prior art stuffing devices generally provide a fairly wide range of adjustment for producing stuffed casings of desired diameter, the adjustments are usually left to the judgment of the operator, thereby resulting in understuffing or overstuffing caused by deviation from the optimum size recommended by the casing manufacture. In addition, the prior art devices do not have means for controlling the shape and tightness of stuffing for both the leading and trailing ends of the stuffed casing.

In the copending application of V. Kupcikevicius and A. L. Mika. Ser. No. 627,252 having a common assignee and which was filed on Oct. 30, 1975 there is disclosed an apparatus for controlling the uniformity of stuffed diameter and conformation of the terminal ends of a sausage product. Moreover in the copending application of J. H. Beckman, Ser. No. 627,253, having a common assignee and which was filed on Oct. 30, 1975, there is disclosed a prepackaged shirred tubular casing article containing a presizing means confined within a unshirred portion of casing length.

Utilization of the shirred tubular casing article containing the presizing means in combination with the stuffing apparatus disclosed in application Ser. No. 627,252 has resulted in a uniformly stuffed, predetermined controlled diameter stuffed product. An important factor to be considered for producing accurate diameter stuffed products is the proper size of the disc which, as explained in the disclosure of application Ser. No. 627,253, is preselected by the manufacturer. Thus, each shirred tubular casing for use on the apparatus of application Ser. No. 627,252 is provided with its own sizing disc at the factory where it is implanted within the casing near one end before shipment to the user. Conventional discs for this purpose are provided with a bayonet twist type locking device for securing the disc onto the support sleeve of the stuffing horn assembly.

After a shirred tubular casing is depleted, the operator removes the sizing disc intact from the support sleeve of the stuffing horn assembly in order to mount a new shirred tubular casing article with its own implanted disc. In removing a previously used disc however, it is not destroyed during this operation and introduces the possibility that the operator will utilize the spent disc in a shirred casing for which it was not intended.

In order to insure that only the proper size disc be used with consonant size casing in the stuffing operation, it would be advantageous to utilize a disc in a prepackaged shirred tubular casing article which is not reusable thereby precluding the possibility of the operator placing a used disc into a shirred tubular casing and thereby producing an unsatisfactory product as a result of using an improper disc.

It is therefore an object of the present invention to provide a self-locking sizing disc for a shirred tubular casing length which coacts with a stuffing apparatus to control the diameter of the stuffed sausage product.

Another object is to provide a self-locking sizing disc which is relatively easy to insert onto a support sleeve of the stuffing horn assembly of a stuffing apparatus used.

A further object is to provide a self-locking sizing disc which is non-reusable thereby precluding the possibility of the operator placing a used disc into a shirred casing not consonant therewith and thereby producing a unsatisfactory product as a result of using an improper disc.

These and other objects will become apparent from the following description of the invention taken in conjunction with the accompanying drawing in which:

FIG. 1 is a front elevational view of a sizing disc according to the present invention.

FIG. 2 is a vertical section taken along line 2—2 of FIG. 1.

FIG. 3 is an exploded perspective view of the sizing disc shown in FIG. 1 in juxaposition with a modified support sleeve of a stuffing apparatus before assembly of both members;

FIG. 4 is a perspective view of both members of FIG. 1 immediatey prior to locking assembly;

FIG. 5 is a longitudinal section of both members before assembly;

FIG. 5A is a view similar to FIG. 5 showing both members after assembly;

FIG. 5B is a transverse vertical section taken along the line 5B—5B of FIG. 5A;

FIG. 5C is a section similar to 5B showing the sizing disc having been rotated with respect to the unload index tabs;

FIG. 5D is a longitudinal section of both members, the disc having been rotated approximately 60° and the protrusions being forced over a portion of the support sleeve, the protrusions thereby being fractured and deformed;

FIG. 5E is a view similar to FIG. 5D showing the sizing disc being separated from the front end of the support sleeve, the protrusions having been fractured and deformed;

FIG. 6 is an enlarged detail of a protuberance before fracture; and

FIG. 7 is an enlarged detail of a protuberance after fracture.

In accordance with the present invention, there is provided an improvement in a sizing disc for a shirred tubular casing length utilized in a stuffing apparatus, wherein the sizing disc is confined within an unshirred portion of said tubular casing length and mounted on a support sleeve of a stuffing horn assembly of a stuffing apparatus and wherein the sizing disc includes an annular casing length contacting portion, and a wall support integrally associated with the contacting portion and extending inwardly therefrom to a terminal end portion of the wall support to define an annulus adapted to mount the sizing disc onto a support sleeve. The improvement includes self-locking means disposed on the terminal end portion of the wall support. In a broad aspect the self-locking means comprises a resilient member integrally associated with the terminal end portion and which is adapted to be urged outwardly away from the central axis of upon being advanced over a first barrier of said sleeve and to resume its original configuration when confined in self-locking engagement in an annular groove disposed adjacent said first barrier and being further adapted to be permanently deformed in a manner such as to clear said first barrier upon removing said disc from said support sleeve. In a more specific aspect, the self-locking means has a plurality of independently resilient protrusions each of which extend laterally from the terminal central end portion and which are tapered inwardly towards the central axis of the disc. Each protrusion is provided with a fracture zone. The protrusions are adapted to be urged outwardly away from the central axis of the disc upon being passed over a barrier adjacent the fore end on a support sleeve of a stuffing apparatus and to resume their original configuration when confined in self-locking engagement in an annular groove disposed adjacent the barrier on the support sleeve. The protrusions are further adapted to be permanently distorted at their respective fracture zones when urged over a second barrier disposed adjacent and rearward of the annular groove of the support sleeve.

The improved sizing disc of the instant invention is particularly adapted for use in the prepackaged tubular casing article disclosed in application Ser. No. 627,253 and in the apparatus disclosed in application Ser. No. 627,252, the disclosures of which are incorporated herein by reference.

In general, the apparatus disclosed in Serial No. 627,252 is an apparatus for controlling the uniformity of stuffed diameter and conformation of the terminal ends of a food product such as sausage product comprising in combination, a frame, a stuffing horn assembly including a central support tube having an inlet end and a discharge end for conveying food emulsion from a supply source, and sleeve means movably mounted with respect to said support tube. The shirred tubular casing article of Ser. No. 627,253 having a diameter presizing means confined within an unshirred portion of said tubular casing, is mounted on the sleeve means by the presizing means which is detachably mounted and secured on the sleeve.

More specifically, the apparatus disclosed in copending application Ser. No. 627,252 employs a stuffing horn assembly which includes a central support tube adapted for ready connection to a supply of pressurized meat or other emulsion, typically utilizing a conventional supply hopper and pump system. The central support tube of the horn assembly has an inlet end and discharge end and serves as a conduit to convey the emulsion from a supply source connected at its inlet end to its discharge end. The stuffing horn assembly is arranged to provide sleeve means including a support sleeve journaled thereon, with the support sleeve being adapted to mount and detachably secure thereto the sizing means implanted in the shirred tubular casing in a manner such that the support sleeve can be reciprocated to manipulate the position of the secured sizing disc while supporting the shirred tubular casing thereon.

Minor structural changes are required to be made on the support sleeve of the stuffing apparatus disclosed in the application Ser. No. 627,252 in order to accommodate the self-locking means of the presizing disc of the instant invention. As explained previously, the presizing disc disclosed in said application is secured to the support sleeve by means of a bayonet or twist type locking means. Thus the fore end of the support sleeve was provided with restraining shoulder elements which mated with elements of the presizing disc in order to achieve the twist type locking arrangement. In the enclosed drawing for the instant invention, the pertinent portion of the modified support sleeve is shown in FIGS. 3, 5 and 5A, 5D, and 5E.

Thus for a clearer understanding of the present invention, reference is made to the drawing and particularly FIGS. 1 and 2 wherein reference number 10 generally designates the self-locking presizing disc of the invention.

The presizing disc 10 includes an annular casing length contacting portion or rim 12 and a hub wall support 14 which is integrally connected to rim 12 and which extends inwardly therefrom to a terminal end portion 16. The terminal end portion 16 defines an annulus having a diameter in excess of the barrier portions of the modified support sleeve (as will be described hereafter) so that the presizing disc 10 can be mounted on and moved with respect to the support sleeve.

The presizing disc has an outer perimeter (the outer perimeter of rim 12) larger than the inner perimeter of the unshirred portion of the casing length to be processed so that the casing length is circumferentially stretched as it passes over rim 12 of the presizing disc. It is preferred that the rim 12 and hub wall support 14 be relatively inelastic so that diametric distortion of the presizing disc by the force of the casing length against the rim 12 is prevented. Moreover, it is also preferred that the outer periphery of the rim 12 be continuous or uninterrupted so as to provide equal or even pressure against the contacting unshirred portion of casing length.

The presizing disc 10 is also provided with self-locking means which self-lock the sizing disc 10 onto a modified form of the support sleeve of the stuffing apparatus disclosed in application Ser. No. 627,252. The preferred form of the self-locking means are illustrated in FIGS. 1 and 2 of the drawing as a plurality of independently resilient protuberances or fingers 18 which are disposed on the terminal end portion 16. As best seen in FIG. 2, each finger is of equal length and has a portion 20 which tapers inwardly in a direction toward the central axis of the disc and a portion 22 which is substantially aligned with the longitudinal axis of the disc.

As best seen in FIGS. 2, 5 and 6, the fracture zone shown as a fracture line or more specifically in the form of a fracture recess or notch 24 is situated on each finger on the surface of the portion 20 proximate the terminal end portion and each fracture recess of each finger 18 is equidistant from the terminal end portion. The fracture recess extends transversely across the finger 18 and provides a fracture line or line of weakening which renders the fingers 18 frangible at the recess site and which causes a greenstick fracture of fingers 18 upon the proper application of bending force directed against the lower surface of the fingers.

It is important that the fingers be fractured but not broken completely since any broken pieces would seriously interfere with the stuffing operation. Advantageously, according to the instant invention the fingers 18 do not become separated from the terminal end portion 16 of hub wall 18 upon fracture.

In FIG. 1, four fingers are disposed in adjacent relationship to constitute a group of fingers. Although in the preferred embodiment three such groups are illustrated, it will be obvious that the disc can accommodate fewer groups of fingers. On the other hand, more than three groups of fingers can be accommodated and the entire terminal end portion 16 can be equipped with the fingers of the instant invention. In addition, although four fingers constitute a group of fingers, it will be understood that fewer than or more than four fingers can constitute a group. Indeed, the self-locking means can in effect be a resilient member extending circumferentially about the periphery of the terminal end portion. The number of fingers per group or the number of groups, will depend on the choice of materials utilized, the type of casing to be processed and other variables. The required amounts can easily be ascertained by one skilled in the art and depends upon an analysis of the above criteria.

In the preferred embodiment shown in FIG. 1, three such groups of fingers are shown and are separated from each other by spaces 26.

The presizing disc 10 can be fabricated from any material capable of withstanding the stresses imposed upon it during operation. Merely as illustrative, the presizing disc 10 as well as fingers 18 can be fabricated from a metal such as stainless steel or a plastic such as polyethylene, nylon, Teflon and like materials. Polyethylene is the preferred material.

As mentioned previously, the presizing disc 10 of the instant invention can be used on the apparatus disclosed in application Ser. No. 627,252, and all that is required is that the support sleeve described therein be slightly modified to accommodate the presizing disc of the instant invention.

FIGS. 3, 5, 5A, and 5E best illustrate the modified support sleeve for accommodating the presizing disc 10 of the instant invention. The support sleeve, generally indicated by reference numeral 28 is provided with a first barrier portion 30 at its fore end 32. The fore edge 34 of the barrier portion has a slight taper 36 which first contacts the taper portion 20 of fingers 18 of presizing disc 10 as the disc is mounted on the support sleeve 28. The first barrier portion 30 is generally of circular configuration and is slightly smaller in diameter than the terminal end portion 16 of presizing disc 10. The first barrier portion extends from the fore end 32 of the support sleeve 28 and terminates in an annular groove 38 defining a shoulder 40 of the first barrier portion 30. Situated on the first barrier portion is loading index tab 42 which projects outwardly from the first barrier portion 30 and which is of a width less than the spacing between the groups of fingers 18 of disc 10 which spacing provides a keyway identified as numeral 26.

The bottom of annular groove 38 of support sleeve 28 extends aft from shoulder 40 to a taper portion 46 comprising a pilot for a second barrier portion 44 of the support sleeve. Second barrier portion 44 terminates in a cylindrical portion shown by reference numeral 48. Affixed to the surface of second barrier portion 44 are three unloading index tabs 50 which are circumferentially disposed and spaced apart to mate with the keyways 26 separating the groups of fingers of the presizing disc 10.

The width of each unloading index tab 50 is less than the width of keyway 26 so that the presizing disc can be readily urged onto taper portion 46 and then across the surface of the second barrier portion 44 when each tap 50 is aligned with keyway 26. The fore end of each unloading index tab 50 defines a front edge 52 which is adapted to prevent aft movement of the presizing disc 10 when it is situated in annular groove 38.

In a typical mode of loading and unloading, the presizing disc 10 is placed in juxtaposition with the modified support sleeve of the stuffing apparatus as shown in FIG. 3. One of the keyways 26 is aligned with the loading index tab 42 of the support sleeve 28. Upon urging the disc towards the support sleeve, the fingers contact taper portion 36 of the first barrier portion 30. Upon the application of constant axial pressure the fingers 18, due to their resiliency, are urged radially outwardly and slidably engage the first barrier portion 30 as shown in FIG. 4. The pressure is continued until the fingers clear the shoulder 40 of the barrier portion 30 to index then in the annular groove 38 of the support sleeve 28. The resilient fingers then return to their original configuration and rest on the bottom of the groove 38 with their tips 19 indexed against shoulder 40 as shown in FIGS. 5A and 5B and the hub wall 14 rests against the fore end 52 of each unloading index tab 50. When securely locked in this position the stuffing operation can proceed. After completion of the stuffing operation or when a casing length is depleted, the presizing disc can be removed by rotating presizing disc 10 so that each of the keyways 26 are aligned with the unloading index tabs 50. The presizing disc 10 is thereafter urged towards the aft end of the support sleeve 28. This causes the fingers 18 to be urged radially outwardly as they slidably engage taper portion 46 of the second barrier portion 44. The pressure is continued until the fingers are permanently distorted as a result of the greenstick fracture occurring at the fracture recess 24 as shown in FIGS. 5D and 7. As a result of the greenstick fracture of the fingers, in this state the fingers define an annulus having a greater diameter than the diameter of the first barrier portion 30. The disc can thereafter be pulled across the annular groove 38 and can be removed from the support sleeve by pulling the presizing disc 10 over barrier portion 30.

As will be evident from the foregoing, a principal advantage derived from the novel self-locking presizing disc of the instant invention, is the relative ease of mounting and removing the presizing disc from the support sleeve of a stuffing apparatus. Moreover, in order to remove the presizing disc from the stuffing horn, it is necessary to fracture the fingers to provide for the increased diameter required to clear the first barrier portion. The disadvantages of a fracture accompanied by complete separation of any pieces of the fingers from the hub, will be obvious to one skilled in the art. This is particularly important during the stuffing operation of food emulsions where broken off pieces could be enclosed in a packaged stuffed food product. The novel construction of the presizing disc of the invention insures that no breakage with separation of the pieces, can occur.

Alternative embodiments and modes of practicing the invention, but within its spirit and scope, will, in the light of this disclosure, occur to persons skilled in the art. It is intended, therefore, that this description be taken as illustrative only and not be construed in any limiting sense.

What is claimed is:

1. An improvement in a presizing disc for a shirred tubular casing length utilized in a stuffing apparatus, wherein said presizing disc is confined within an unshirred portion of said tubular casing length and is adapted to be mounted on a support sleeve of a stuffing horn assembly of a stuffing apparatus, said support sleeve having a first barrier and a second barrier and an annular groove disposed adjacent said first barrier, and wherein said presizing disc includes an annular casing length contacting portion and a wall support which is integrally associated with said contacting portion and extends inwardly therefrom to a terminal end portion of said wall support to thereby define an annulus adapted to mount said presizing disc onto said support sleeve, the improvement comprising self-locking means disposed on said terminal end portion of said wall support, said self-locking means including a resilient member integrally associated with said terminal end portion which is adapted to be urged outwardly away from the central axis of said presizing disc upon being advanced over said first barrier of said support sleeve and to resume its original configuration when confined in self-locking engagement on said sleeve in said annular groove disposed adjacent said first barrier, and being further adapted to be permanently deformed in a manner such as to clear said first barrier upon removal of said disc from said support sleeve.

2. The improvement of claim 1 wherein said resilient member comprises a plurality of independently resilient protrusions, each of said protrusions extending laterally from said terminal end portion, and being provided with a fracture zone, said protrusions being adapted to be urged outwardly away from said central axis upon being passed over said first barrier of said sleeve and to resume their original configuration when confined in self-locking engagement in said annular groove disposed adjacent said first barrier of said sleeve, and being further adapted to be permanently distorted at said fracture zone when urged over said second barrier.

3. The improvement of claim 2 wherein each of said protrusions tapers inwardly toward the central axis of said disc.

4. The improvement of claim 2 wherein said fracture zone is a fracture line disposed on each of said protrusions proximate said terminal end portion and substantially equidistant from said terminal end portion.

5. The improvement of claim 4 wherein said fracture line is defined by a fracture recess extending transversely across each of said protrusions.

6. The improvement of claim 2 wherein said protrusions are disposed on said terminal end portion in a manner consitituting at least one group of protrusions, each of said protrusions being of equal length.

7. The improvement of claim 6 wherein said group of protrusions includes a keyway for guiding said presizing disc onto said support sleeve.

8. The improvement of claim 2 wherein said protrusions are disposed on said terminal end portion in a manner constituting a plurality of groups of protrusions, each of said groups being separated by a keyway for guiding said presizing disc onto said support sleeve.

9. The improvement of claim 8 wherein each of said groups contains a plurality of independently resilient protrusions.

10. The improvement of claim 2 wherein said protrusions are disposed on said terminal end portions in a manner constituting three groups of protrusions, each of said groups being separated by a keyway for guiding said presizing disc onto said support sleeve.

11. The improvement of claim 10 wherein each of said groups contains three independently resilient protrusions.

12. The improvement of claim 2 wherein said protrusions are frangible and provide a greenstick fracture at said fracture zone when sufficient force is exerted against said protrusions.

13. An improvement in a presizing disc for a shirred tubular casing length utilized in a stuffing apparatus, wherein said presizing disc is confined within an unshirred portion of said tubular casing length as is adapted to be mounted on a support sleeve of a stuffing horn assembly of a stuffing apparatus said support sleeve having a first barrier and a second barrier and an annular groove disposed adjacent said first barrier, and wherein said presizing disc includes an annular casing length contacting portion and a wall support which is integrally associated with said contacting portion and extends inwardly therefrom to a terminal end portion of said wall support to thereby define an annulus adapted to mount said presizing disc onto said support sleeve, the improvement wherein self-locking means are disposed on said terminal end portion of said wall support, said self-locking means comprise a plurality of independently resilient protrusions with each of said protrusions extending laterally from said terminal end portion and tapering inwardly toward the central axis of said disc and with each protrusion being provided with a fracture zone, said protrusions being adapted to be urged outwardly away from said central axis upon being passed over said first barrier of said sleeve and to resume their original configuration when confined in self-locking engagement in said annular groove disposed adjacent said first barrier of said sleeve, and being further characterized in that said protrusions are frangible and provide a greenstick fracture at said fracture zone when sufficient force is exerted against said protrusions.

14. The improvement of claim 13 wherein said fracture zone is a fracture line disposed on each of said protrusions proximate said terminal end portion and substantially equidistant from said terminal end portion.

15. The improvement of claim 14 wherein said fracture line is defined by a fracture recess extending transversely across each of said protrusions.

16. The improvement of claim 13 wherein said protrusions are disposed on said terminal end portion in a manner constituting at least one group of protrusions, each of said protrusions being of substantially equal length.

17. The improvement of claim 16 wherein said groups of protrusions includes a keyway for guiding said presizing disc onto said support sleeve.

18. The improvement of claim 13 wherein said protrusions are disposed on said terminal end portion in a manner constituting a plurality of groups of protrusions, each of said groups being separated by a keyway for guiding said presizing disc onto said support sleeve.

19. The improvement of claim 18 wherein each of said groups contains a plurality of independently resilient protrusions.

20. The improvement of claim 13 wherein said protrusions are disposed on said terminal end portions in a manner constituting three groups of protrusions, each of said groups being separated by a keyway for guiding said presizing disc onto said support sleeve.

21. The improvement of claim 20 wherein each of said groups contains three independently resilient protrusions.

* * * * *